A. W. REDIN.
DRILLING MACHINE.
APPLICATION FILED AUG. 7, 1911.

1,043,724.

Patented Nov. 5, 1912.
5 SHEETS—SHEET 1.

A. W. REDIN.
DRILLING MACHINE.
APPLICATION FILED AUG. 7, 1911.

1,043,724.

Patented Nov. 5, 1912.

5 SHEETS—SHEET 2.

Witnesses.
W. L. Dow
E. Behel.

Inventor:
Andrew W. Redin
By A. O. Behel
Atty.

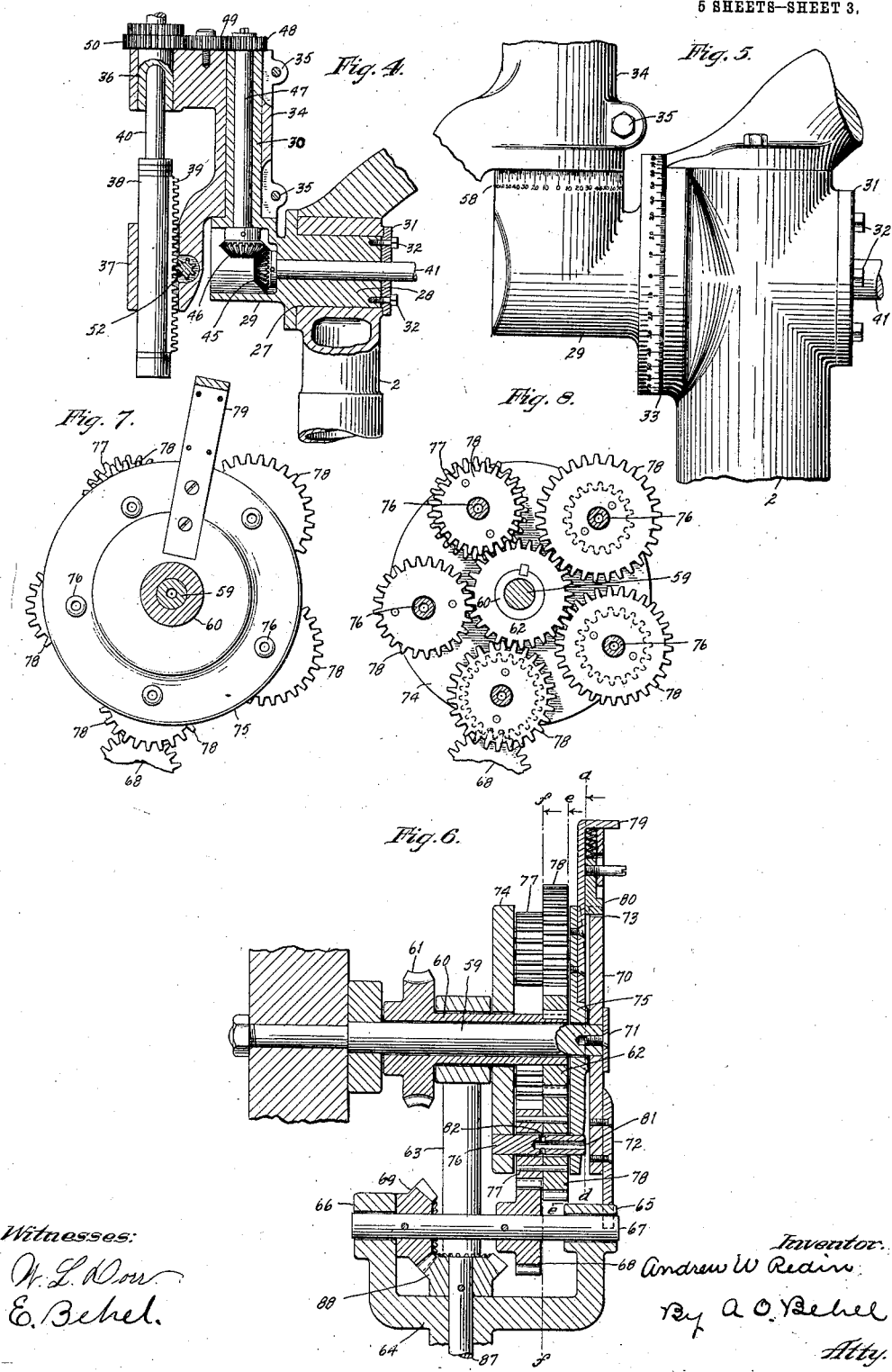

A. W. REDIN.
DRILLING MACHINE.
APPLICATION FILED AUG. 7, 1911.

1,043,724.

Patented Nov. 5, 1912.

5 SHEETS—SHEET 4.

Witnesses:
E. Behel.
W. L. Dow

Inventor:
Andrew W. Redin
By A. O. Behel
Atty.

COLUMBIA PLANOGRAPH CO., WASHINGTON, D. C.

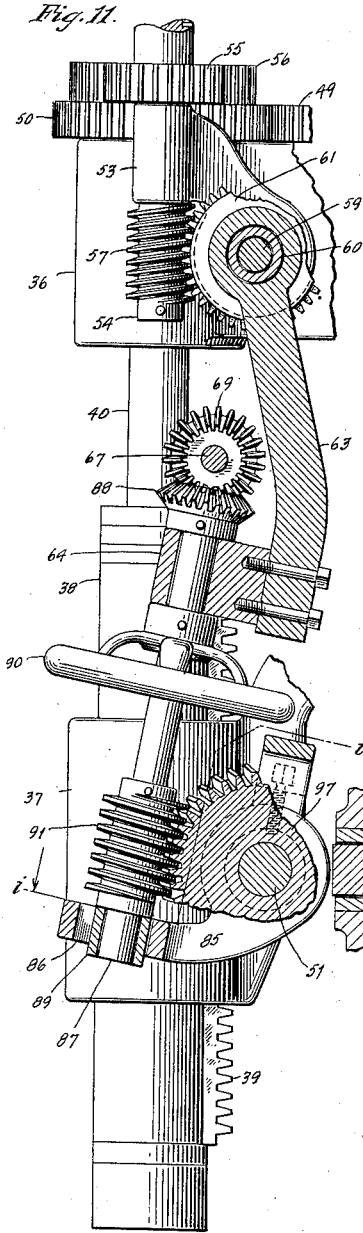
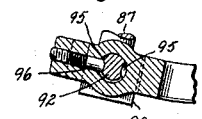
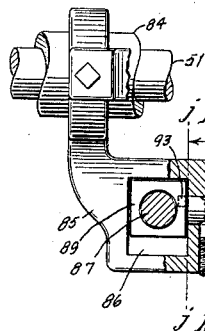
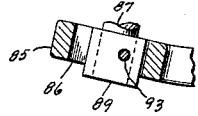
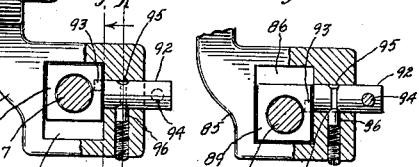
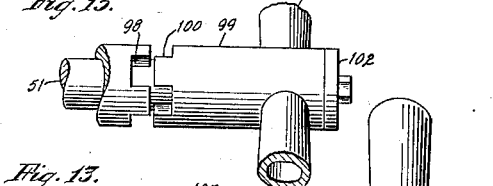
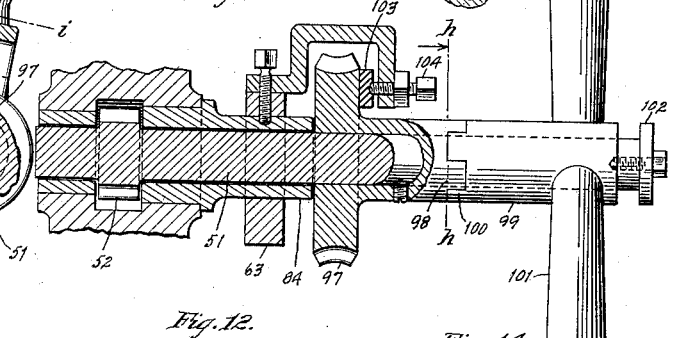
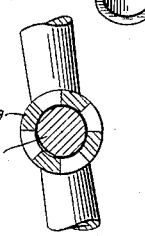
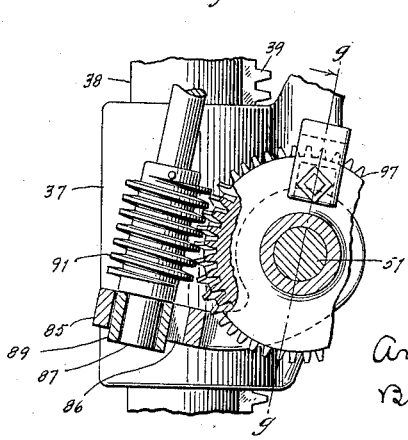

UNITED STATES PATENT OFFICE.

ANDREW W. REDIN, OF ROCKFORD, ILLINOIS, ASSIGNOR TO W. F. & JOHN BARNES COMPANY, OF ROCKFORD, ILLINOIS, A CORPORATION OF ILLINOIS.

DRILLING-MACHINE.

1,043,724.  Specification of Letters Patent.  Patented Nov. 5, 1912.

Application filed August 7, 1911. Serial No. 642,884.

*To all whom it may concern:*

Be it known that I, ANDREW W. REDIN, a citizen of the United States, residing at Rockford, in the county of Winnebago and State of Illinois, have invented certain new and useful Improvements in Drilling-Machines, of which the following is a specification.

The object of this invention is to construct a drilling machine with a head capable of an oscillatory movement on a horizontal pivot, and the drill spindle capable of an oscillatory movement on a vertical pivot, and graduations for each of the pivotal movements to determine the angles at which they are set.

Figure 1:
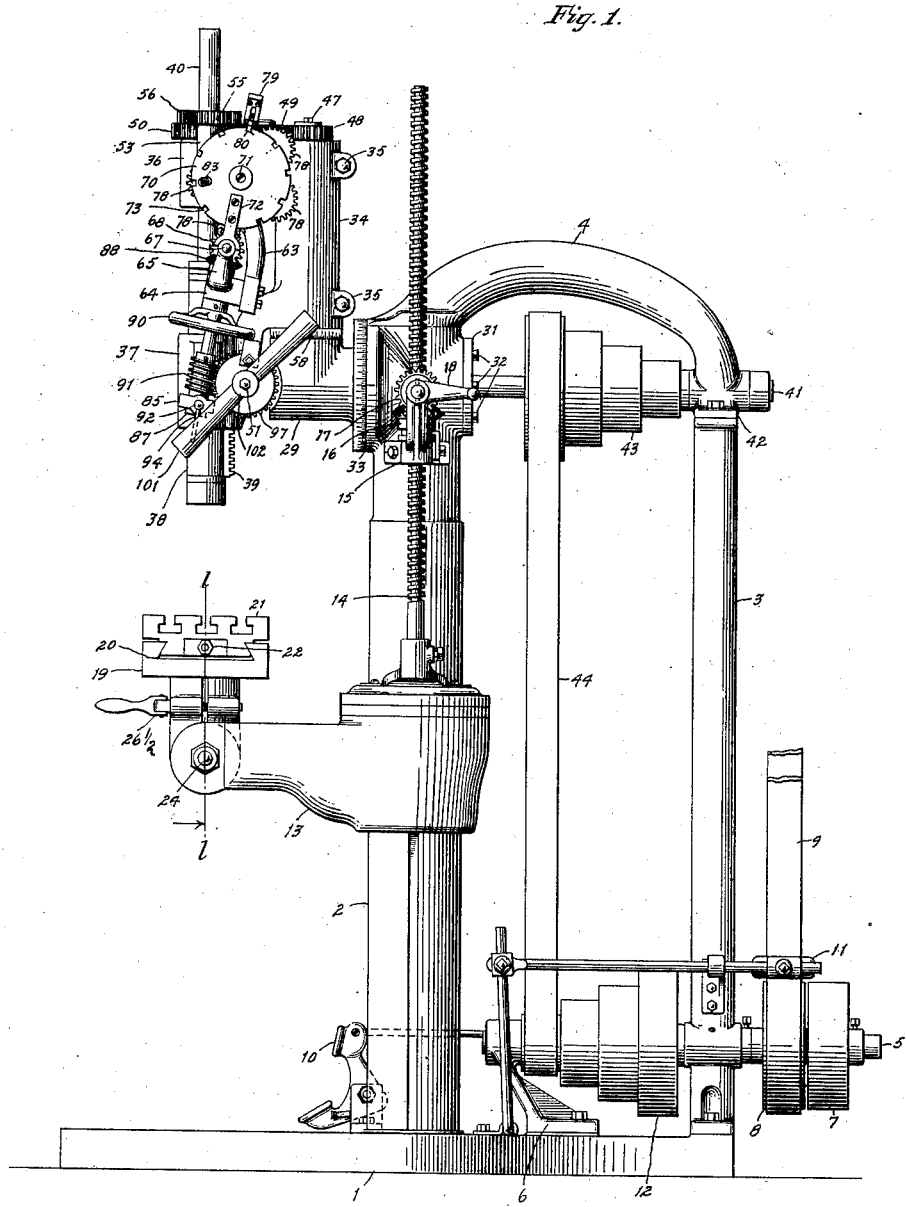
Figure 2:
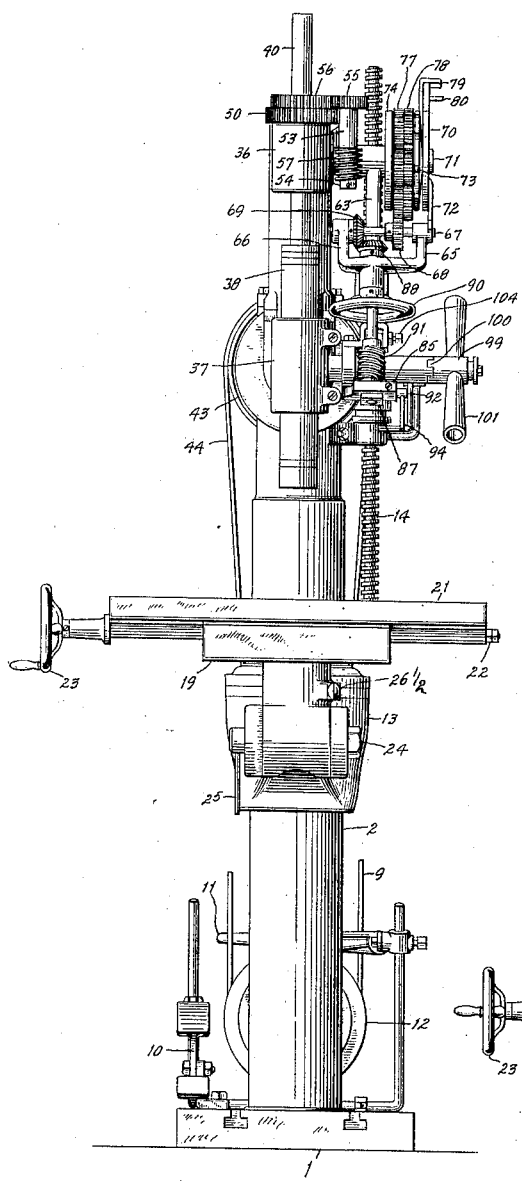
Figure 3:
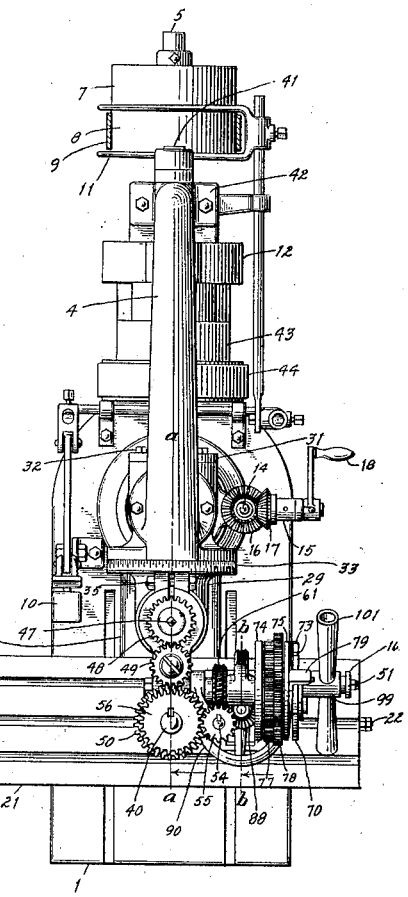
Figure 9:
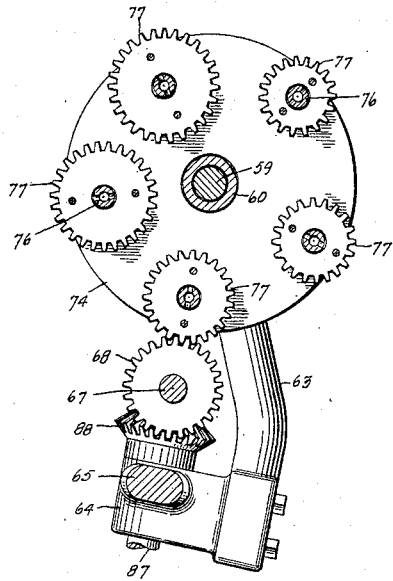
Figure 10:
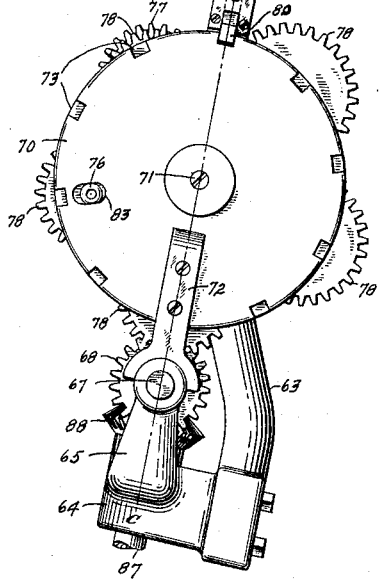
Figure 20:
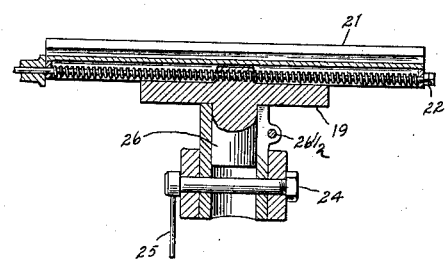

In the accompanying drawings, Figure 1 is a side elevation of my improved drill. Fig. 2 is a front elevation. Fig. 3 is a plan view. Fig. 4 is a section on line $a$ $a$ Fig. 3. Fig. 5 is an enlarged view showing in elevation the graduations for the adjustments of the head and for the adjustment of the drill spindle. Fig. 6 is a section on line $c$ $c$ Fig. 10. Fig. 7 is a section on line $d$ $d$ Fig. 6. Fig. 8 is a section on line $e$ $e$ Fig. 6. Fig. 9 is a section on line $f$ $f$ Fig. 6. Fig. 10 is a side elevation of the upper portion of the drill showing the changeable speed gearing. Fig. 11 is a section on line $b$ $b$ Fig. 3. Fig. 12 is a section on line $b$ $b$ Fig. 3, showing the worm and worm wheel connection with the cross-shaft. Fig. 13 is a section on line $g$ $g$ Fig. 12. Fig. 14 is a section on line $h$ $h$ Fig. 13. Fig. 15 is an elevation of the clutch connection between the cross-shaft and lever for rotating same. Fig. 16 is a section on line $i$ $i$ Fig. 11. Fig. 17 is a section on line $i$ $i$ Fig. 11 in which the block is moved into a different position than shown at Fig. 16. Fig. 18 is a section on line $j$ $j$ Fig. 16. Fig. 19 is a section on line $k$ $k$ Fig. 16. Fig. 20 is a section on line $l$ $l$ Fig. 1.

From the base 1 rises a column 2, and a rear brace 3 connecting the column by the cross-brace 4. A counter-shaft 5 is supported by the rear brace 3 and a bearing 6 secured to the base 1. Tight and loose pulleys 7 and 8 are supported by the counter-shaft, and a belt 9 connects these pulleys with the line shafting. A treadle 10 has a connection with the belt shifter 11. A cone-pulley 12 has a driving connection with the counter-shaft 5. Around the column is located a bracket 13, to which is connected a screw 14 which extends upwardly therefrom. A bracket 15 is secured to the upper portion of the column and supports two miter-gears 16 and 17 which are located in mesh. The screw 14 has a screw-threaded engagement with the gear 16, and a crank 18 is connected with the gear 17. By means of the crank 18, the gear 16 is rotated, which will raise or lower the screw 17, thereby raising or lowering the bracket 13. The bracket 13 supports a shelf 19, which is provided with a guide-way 20 in its upper face. A table 21 is movable in the guide-way 20 and is adjusted by the screw 22 which is turned by the hand-wheel 23. The shelf 19, in its connection with the bracket 13, is supported on the pivot bolt 24, which is turned by the lever 25. From the shelf 19 depends a stud 26, which is clamped by the screw 26½. This shelf and the table supported by it, is capable of a turning movement on the vertical stud 26, and a turning movement on the horizontal pivot bolt 24, and the table is capable of a sliding movement in connection with the shelf 19.

The upper portion of the column is formed with a horizontal opening 27, Fig. 4, within which is located the tubular portion 28 of the head 29. This head has a vertical tubular portion 30. The tubular portion 28 is clamped within the horizontal opening 27 by the plate 31 and clamping screws 32, and by loosening these screws, the head can be turned within the opening 27, and clamped when adjusted. Graduations 33 are provided for the head 29 in connection with the adjustment thereof on the horizontal tubular portion 28. Around the vertical tubular portion 30 of the head 29 is located a spindle support 34 clamped around the vertical tubular portion by the screws 35. Graduations 58 are provided for the head 29 in connection with the adjustment of the vertical tubular portion 30. From the support 34 extend two vertical bearings 36, and 37, the bearing 37 guiding a sleeve 38 provided with a rack 39. A drill spindle 40 is supported in the bearing 36, and is connected with the sleeve 38 in the usual manner. A main driving shaft 41 is supported in a bearing 42 in the rear brace 3 and is located in the horizontal tubular portion 28 of the head 29. To this main-shaft is secured a cone-pulley 43, which is driven by the belt 44 connected with the cone-pulley 12, on the center shaft 5. A beveled gear 45 is connected with the main drive shaft 41, and meshes with a bevel gear 46 connected to a shaft 47 located in the vertical tubular portion 30 of the head 29. To the upper end of the shaft 47 is connected a spur-gear 48. An intermediate spur-gear 49 is supported adjacent to the spur-gear 48 and meshes therewith. A spur gear 50 has an engagement with the drill-spindle 40, and the spindle is capable of a vertical or lengthwise movement through this gear. Upon the rotation of the shaft 41, a rotary movement will be imparted to the drill spindle through the gearing just described. A cross-shaft 51 is supported in the bearing 37, and supports a spur-pinion 52 which meshes with the rack 39. From the bearing 36 extends a bracket 53 which supports a short shaft 54, to the upper end of which is connected a gear 55 which meshes with a gear 56 rotatable with the gear 50, and to the lower end of this shaft is secured a worm 57. A stud 59 extends from the bearing 36 and it supports a sleeve 60 to which is connected a worm wheel 61, and a spur-gear 62. Around the sleeve 60 is located a swinging support 63 to the lower end of which is connected a bearing block 64 from which rise two bearings 65 and 66 which support a shaft 67. A spur-gear 68 and a bevel gear 69 are secured to the shaft 67. A disk 70 is held in connection with the rod 59 by the plate and screw 71. This plate is held against rotation by the plate 72 connected to it and engaging the bearing 65. This disk 70 is provided with a plurality of peripheral notches 73.

The sleeve 60 supports a plate 74, and the rod 59 supports a plate 75 so as to turn thereon. The plate 74 supports a plurality of studs 76 each supporting an inner spur-gear 77, and an outer spur-gear 78 which are connected to rotate together. The spur-gears 78 are of varying diameters and mesh with the spur gear 62 on the sleeve 60. The spur-gears 77 are so located as to be capable of being placed in mesh one at a time with the spur-gear 68 on the shaft 67. To the plate 75 is connected a lever 79 provided with a spring actuated dog 80 which is adapted to enter the notches 73 in the plate 70, thereby locking any one of the spur-gears 77 in mesh with the spur-gears 68. The studs 76 are each provided with a central opening 81 and transverse holes 82 Fig. 6, for the purpose of oiling the gears supported thereby. An opening 83, Fig. 10, is formed in the plate 70, behind which any one of the studs 76 may be presented so that oil may be inserted into the stud. Upon the rotation of the worm 57, a rotary movement will be imparted to the worm wheel 61, and through the sleeve 60 to the spur-gear 62, thence to the spur-gear 78 and by them to the spur-gear 77. The spur-gear 77 that is in mesh with the spur gear 68 will rotate said spur-gear 68, and it in turn will rotate the shaft 67, and the bevel-gear 69 connected to it. By means of the lever 79 any one of the spur-gears 77 can be brought and held in mesh with the spur-gear 68, and as the spur-gears 77 and 78 are respectively of different diameters, the speed of the gear 69 can be varied. To the sleeve 84 supporting the cross-shaft 51 is connected a bracket 85 which is provided with a slot 86. A shaft 87 is supported in the bearing block 64, and to one end of which is connected a bevel-gear 88 which meshes with the bevel-gear 69. The lower end of the shaft 87 is located in a block 89 located in the slot 86. A hand wheel 90 and a worm 91 are connected to the shaft 87. The block 89 is capable of a movement in the slot 86, and the means for moving the block and holding it at the ends of its movement comprises the oscillatory rod 92 having an offset pin 93 which engages the block 89. A lever 94 has a connection with the rod 92, by which it is oscillated, and the oscillation of this rod will move the block 89 back and forth in the slot 86.

The rod 92 is formed with two recesses 95, and a spring actuated plunger 96 in being seated in one of these recesses will hold the rod against axial movement, which in turn will hold the block against movement. To the cross-shaft 51 is fixedly connected a worm wheel 97 having a clutch face 98. A movable section 99 has a clutch face 100, also a cross-bar 101 serving as a hand lever for turning same. This movable section is held against displacement in connection with the cross-shaft by the cap 102. A friction block 103 is held against the worm-wheel 97 by the screw 104. This friction block counterbalances the weight of the sleeve 38, and drill spindle 40. The rotation of the worm 91 will rotate the cross-shaft 51, and spur-gear 52 connected to it, and the spur-gear 52 will move the rack 39 which will raise or lower the drill spindle. By swinging the worm 91 free of the worm-wheel 97, and placing the clutch faces 98 and 100 in engagement, the drill spindle can be raised and lowered by turning the hand lever 101.

By constructing a drilling machine in the manner set forth, the drill spindle can be located to drill in a vertical position, turned on a horizontal axis or swung around on a vertical axis to accommodate it to the location of the material operated upon.

The various movements and adjustments of the work supporting table enables the work to be located with respect to the drill spindle, that the proper hole may be drilled.

I claim as my invention.

1. A drilling machine, comprising a vertical column, a tubular section supported by the column in an oscillatory manner, and having a right angled extension, a drill spindle, a cross shaft for raising and lowering the drill spindle a support for the drill spindle having an oscillatory connection with the extension, a shaft located in the tubular section, a shaft located in the extension, a gear connection between the shafts, a gear connection between the shaft located in the extension and the drill spindle, and a gear connection between the cross-shaft and gearing rotating the drill spindle.

2. A drilling machine comprising a vertical column, a drill spindle, a cross-shaft for longitudinally moving the drill spindle, a swinging shaft having a gear connection with the cross-shaft, and variable speed gearing for rotating the swinging shaft in one direction at different rates of speed.

3. In a machine of the character set forth, the combination with a main support, of a spindle support, a longitudinally movable and rotatable spindle journaled on the spindle support, a rotary mounting for the spindle support on the main support that will permit the swinging movement of the former on an axis substantially parallel to the axis of the spindle, means mounted on the spindle support for longitudinally moving the spindle, driving means mounted on the main support, and gearing connecting the driving means and spindle for effecting its rotation, while permitting its longitudinal movement and the adjustment of the spindle support.

4. In a machine of the character set forth, the combination with a main support, of a substantially horizontal drive shaft thereon, an angularly disposed shaft geared at its lower end to the drive shaft, a spindle support pivotally mounted on the main support with the second shaft as its axis of movement, a longitudinally movable and rotatable spindle mounted on the spindle support in substantially parallel relation to the second shaft, means mounted in the spindle support for longitudinally moving the spindle, and gearing between the second shaft and spindle.

5. In a machine of the character set forth, the combination with a main support, of a substantially horizontal drive shaft thereon, a head surrounding the drive shaft and having an angularly disposed tubular portion, a shaft journaled on the tubular portion and geared to the drive shaft, a spindle support pivotally mounted on the tubular portion, a spindle longitudinally movable and rotatable in the spindle support, gearing connecting the second shaft and the spindle for rotating the latter, while permitting its longitudinal movement, and means mounted on the spindle support and adjustable therewith for effecting the longitudinal movement of the support.

6. In a machine of the character set forth, the combination with a main support, of a head rotatably mounted thereon, a spindle support adjustably mounted on the head, a longitudinally movable and rotatable spindle adjustably mounted on the spindle support, means for rotating the spindle while permitting the adjustment of the head and the spindle support, and also permitting the longitudinal movement of the spindle, and means for longitudinally moving said spindle including a longitudinally movable device in which the spindle rotates.

7. In a machine of the character set forth, the combination with a main support, of a head rotatably mounted thereon, a spindle support rotatably mounted on the head, a longitudinally movable and rotatable spindle mounted on the spindle support, driving means mounted on the main support, gearing connecting the driving means and spindle for rotating the latter while permitting the rotation of the head and spindle support and the longitudinal movement of the spindle, and means for longitudinally moving the spindle.

8. In a machine of the character set forth, the combination with a main support, of a substantially horizontal driving shaft journaled thereon, a head rotatably mounted on the main support with the shaft as an axis, a rotatable spindle support mounted on the head, a rotatable and longitudinally movable spindle journaled on the spindle support, means for rotating the spindle mounted on the head and geared directly to the drive shaft, and means for longitudinally moving the spindle.

9. In a machine of the character set forth, the combination with a main support, of a driving shaft journaled thereon, a head rotatably mounted on the main support with the shaft as an axis, an angularly disposed shaft journaled on the head and geared to the driving shaft, a spindle support rotatably mounted on the head with the angular shaft as an axis, a longitudinally movable and rotatable spindle mounted on the spindle support, gearing for the rotatable spindle engaged with the angular shaft, and means for longitudinally moving the spindle.

10. In a machine of the character set forth, the combination with a main support, of a horizontal shaft journaled thereon, a head rotatably mounted on the main support with the shaft as an axis of movement, means for securing the head in different positions, said head having an angular tubular portion, a shaft journaled on the tubular portion and geared to the driving shaft, a spindle supporting bracket rotatably mounted on the tubular portion, a longitudinally movable and rotatable spindle journaled in the spindle support in parallel relation to the second shaft, gearing connecting the second shaft and spindle for rotating the same, and means mounted on the spindle support for longitudinally moving the spindle.

11. In a machine of the character described, the combination with a rotatable and longitudinally movable spindle, of means for rotating the same, a cross shaft for longitudinally moving the spindle, a swinging support, and gearing for rotating the shaft mounted on the swinging support and movable therewith into and out of associated relation with the cross shaft.

12. In a machine of the character described, the combination with a rotatable and longitudinally movable spindle, of means for rotating the spindle, including a gear surrounding the same, and means engaged with the gear for rotating it and thereby the spindle, a cross shaft engaged with the spindle for longitudinally moving it, a swinging support, and gearing mounted on the swinging support and movable therewith into and out of associated relation with the cross shaft, said gearing being driven by the gear that surrounds the spindle.

13. In a machine of the character described, the combination with a rotatable and longitudinally movable spindle, of means for rotating the spindle, and variable speed gearing for moving the spindle longitudinally in one direction at different rates of speed.

14. In a machine of the character described, the combination with a rotatable and longitudinally movable spindle, of means for rotating the same, and means for longitudinally moving the spindle comprising a shaft having a gear, a rotatable carrier, a plurality of gears mounted on the carrier and movable to bring any one of the same into and out of mesh with the shaft gear, and means for rotating the plurality of gears.

15. In a machine of the character described, the combination with a rotatable and longitudinally movable spindle, of means for rotating the same, and means for longitudinally moving the spindle, comprising a driving shaft, a driven shaft connected with the spindle, a carrier rotatably mounted with one of the shafts as an axis, a plurality of gears of different diameters mounted on the carrier and movable therewith to a position to rotate the driven shaft at different rates of speed, and gearing connecting said plurality of gears with the driving shaft to rotate the same.

16. In a machine of the character described, the combination with a rotatable and longitudinally movable spindle, of a cross shaft geared thereto for longitudinally moving it, a driving shaft having a gear, a rotatable carrier, a plurality of gears mounted thereon and meshing with the gear of the driving shaft, a gear connected with the cross shaft, said gears of the carrier being successively movable into mesh with the latter gear, and means for moving and holding the carrier in different positions.

17. In a machine of the character set forth, the combination with a rotatable and longitudinally movable spindle, of means for rotating the same, a cross shaft geared to the spindle for longitudinally moving it, a driven shaft geared to the cross shaft and having a gear, a driving shaft having a gear, spaced rotatable plates constituting a carrier, gears journaled on the carrier and geared to the driving shaft, said gears being movable into and out of mesh with the gear of the driven shaft, a stationary plate, and a locking device mounted on the carrier and engaging the stationary plate to hold the different gears in mesh with the gear of the driven shaft.

18. In a machine of the character set forth, the combination with a rotatable and longitudinally movable spindle, of means for rotating the same, a cross shaft for longitudinally moving the spindle, a movable support, variable speed gearing mounted on the movable support and movable therewith into and out of associated relation with the cross shaft for moving the spindle longitudinally in one direction at different rates of speed, and means for operating the variable speed gearing.

19. In a machine of the character set forth, the combination with a rotatable and longitudinally movable spindle, of means for rotating the same, a cross shaft for longitudinally moving the spindle, a swinging supporting frame, a gear mounted on the supporting frame and movable into and out of associated relation with the cross shaft upon the swinging of the frame, variable speed gearing mounted on the frame for driving said gear, and means disposed concentric to the axis of movement of the supporting frame for operating the variable speed gearing.

20. In a machine of the character set forth, the combination with an adjustable support, of a rotatable and longitudinally movable spindle mounted thereon, means geared to the spindle for rotating the same, a cross shaft for longitudinally moving the spindle, a swinging frame mounted on the spindle support and having a gear movable therewith into and out of associated relation with the cross shaft, variable speed gearing mounted on the supporting frame for driving said gear, and driving means for the variable speed gearing driven by the means for rotating the spindle.

In testimony whereof I have hereunto set my hand in presence of two subscribing witnesses.

ANDREW W. REDIN.

Witnesses:
A. O. BEHEL,
E. D. E. N. BEHEL.

Copies of this patent may be obtained for five cents each, by addressing the "Commissioner of Patents, Washington, D. C."